United States Patent [19]

Edmaiston

[11] Patent Number: 5,645,478
[45] Date of Patent: Jul. 8, 1997

[54] MATERIAL ELEVATOR FILTER APPARATUS

[76] Inventor: Fred M. Edmaiston, 8309 Honey Hill Cove, Germantown, Tenn. 38138

[21] Appl. No.: 717,304

[22] Filed: Sep. 20, 1996

[51] Int. Cl.$^6$ .................................................. B01D 46/04
[52] U.S. Cl. .......................... 454/49; 55/302; 55/385.1; 55/385.5
[58] Field of Search ................... 454/49; 55/282, 55/302, 341.1, 361, 385.1, 385.5, 428, 430, 431, 467; 198/493, 495

[56] References Cited

U.S. PATENT DOCUMENTS

| | | |
|---|---|---|
| 633,995 | 10/1899 | Graves ............................... 198/495 X |
| 3,097,936 | 7/1963 | Lincoln ................................ 55/302 X |
| 3,383,840 | 5/1968 | Johnson et al. ........................... 55/293 |
| 3,568,414 | 3/1971 | Wyrough ................................. 55/302 |
| 4,180,390 | 12/1979 | Furstenberg ........................ 55/385.1 X |
| 5,549,734 | 8/1996 | Standard ............................. 55/302 X |

*Primary Examiner*—Harold Joyce
*Attorney, Agent, or Firm*—Walker, McKenzie & Walker, P.C.

[57] ABSTRACT

A bucket elevator filter apparatus including a filter unit for removing fugitive airborne particles from air; the filter unit having an inlet for receiving air, a filtered air outlet for discharging filtered air, and a filtered particles outlet for discharging filtered particles; and structure for attaching the filter unit to the hollow casing of a bucket elevator, for forming a passageway between the interior of the hollow casing of the bucket elevator and the inlet of the filter unit, and for allowing air to pass from the interior of the hollow casing of the bucket elevator into the inlet of the filter unit.

11 Claims, 8 Drawing Sheets

MATERIAL ELEVATOR FILTER APPARATUS

CROSS-REFERENCE TO RELATED APPLICATIONS

Not Applicable.

STATEMENT RE FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

The present invention relates, in general, to a filter apparatus for controlling the dust on material elevators, such as typical bucket elevators.

2. Background Art

Bucket elevators are predominantly used in the grain, feed, and mining industries, and in various other industries, as a means to handle raw material. When handling, or elevating, such raw material by use of a bucket elevator, an abundance of fugitive dust particles is created causing air pollution, potential harm and injury to workers and machinery, and dangerous effects.

Nothing in the known prior art discloses or suggests the present invention. More specifically, nothing in the known prior art discloses or suggests a material elevator filter apparatus including a filter means for removing fugitive airborne particles from air; the filter means having an inlet for receiving air, a filtered air outlet for discharging filtered air, and a filtered particles outlet for discharging filtered particles; and inlet for attaching the filter means to the hollow casing of a material elevator, for forming a passageway between the interior of the hollow casing of the material elevator and the inlet of the filter means, and for allowing air to pass from the interior of the hollow casing of the material elevator into the inlet of the filter means.

BRIEF SUMMARY OF THE INVENTION

The present invention provides a filter apparatus for a bucket elevator. A basic concept of the present invention is to add an independent, self contained filter apparatus directly to a bucket elevator leg casing to control the dust created by that bucket elevator.

The filter apparatus of the present invention comprises, in general, filter means for removing fugitive airborne particles from air; the filter means having an inlet for receiving air, a filtered air outlet for discharging filtered air, and a filtered particles outlet for discharging filtered particles; and means for attaching the filter means to the hollow casing of a material elevator (e.g., a typical bucket elevator), for forming a passageway between the interior of the hollow casing of the material elevator and the inlet of the filter means, and for allowing air to pass from the interior of the hollow casing of the material elevator into the inlet of the filter means.

One object of the present invention is to provide an independent self contained filter unit or apparatus for mounting directly to the leg casing of a bucket elevator to control dust produced as the bucket elevator is used to elevate material.

Another object of the present invention is to provide such a filter apparatus that may be mounted on the upside or downside leg causing of a bucket elevator, depending on the type of operation being performed by the bucket elevator.

Another object of the present invention is to provide such a filter apparatus that is self cleaning.

Another object of the present invention is to provide such a filter apparatus that simply returns the collected filtered dust particles back to the product flow within the bucket elevator or delivers the collected filtered dust particles to a conveyor or the like for disposal or storage, etc.

Another object of the present invention is to provide such a filter apparatus that uses internal cloth filter media.

Another object of the present invention is to provide such a filter apparatus that creates a negative air pressure to ventilate the interior of the hollow casing of a bucket elevator by means of an integrated low pressure blower unit.

DETAILED DESCRIPTION OF THE INVENTION

The filter apparatus of the present invention is for use with a material elevator, preferably a typical bucket elevator E, used to elevate material M such as grain, feed, etc. Such a bucket elevator E includes a hollow casing C having an interior I, and includes a plurality of buckets B mounted within the interior I of the hollow casing C on an endless belt B' or the like for moving material M through the interior I of the hollow casing C. The hollow casing C typically includes a upside leg U, a downside leg (not shown), a lower or inlet portion commonly referred to as the boot portion (not shown), and a top or outlet portion (not shown). The lower portion may be located beneath ground level and may include an inlet port for allowing material M to be added into the interior I of the hollow casing C from one or more trucks, conveyors, etc. The top portion may be located 30 meters or move above ground level and may include an outlet port for discharging material M from the interior I of the hollow casing C into the top of one or more silos, storage bins, conveyors, etc. The construction and operation of such bucket elevators is common and well known to those skilled in the art.

Figure 1:
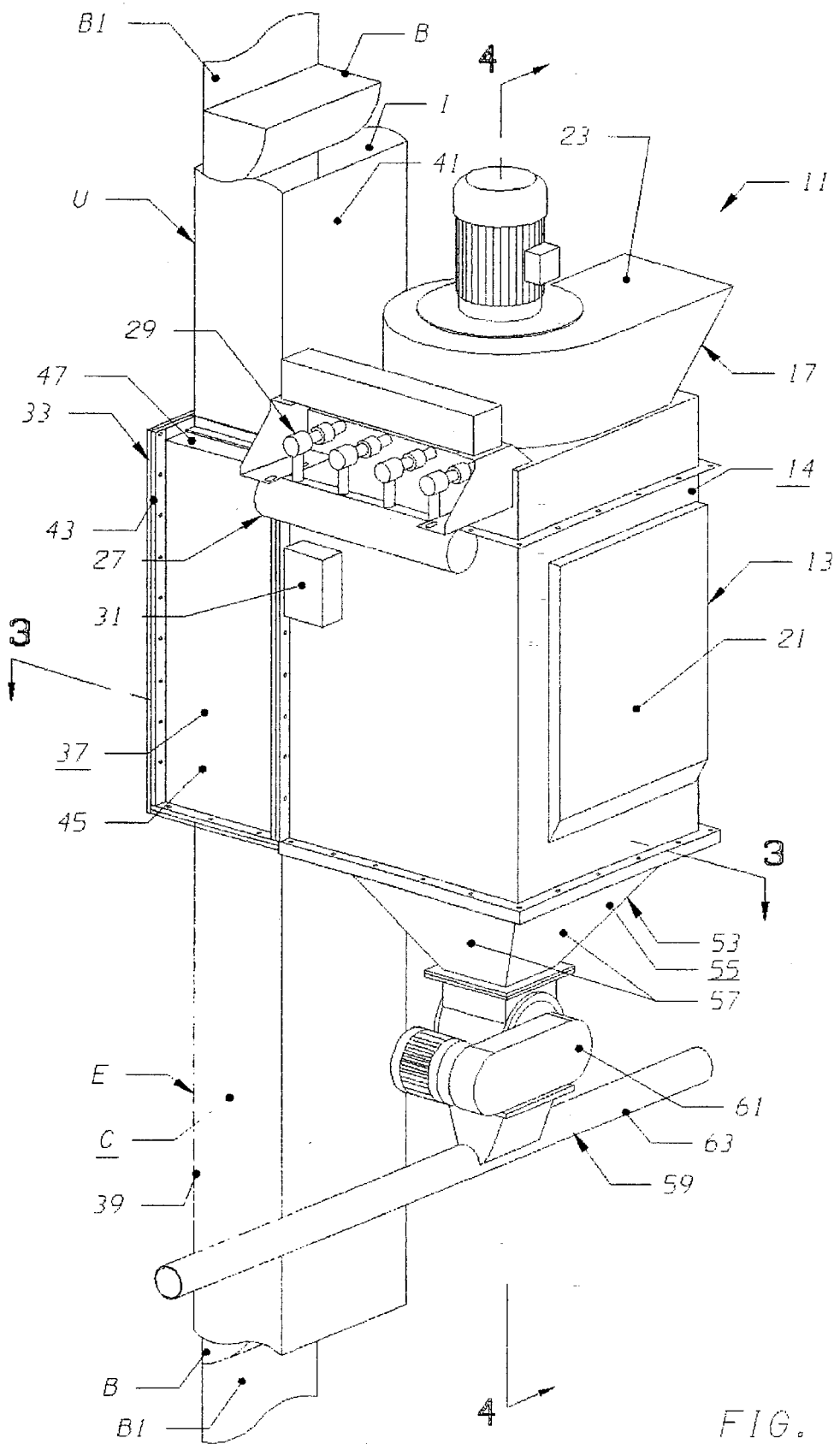
FIG. 1 is a somewhat diagrammatic perspective view of a first embodiment of the filter apparatus of the present invention, shown combined with a bucket elevator and a pneumatic conveyor.
Figure 2:
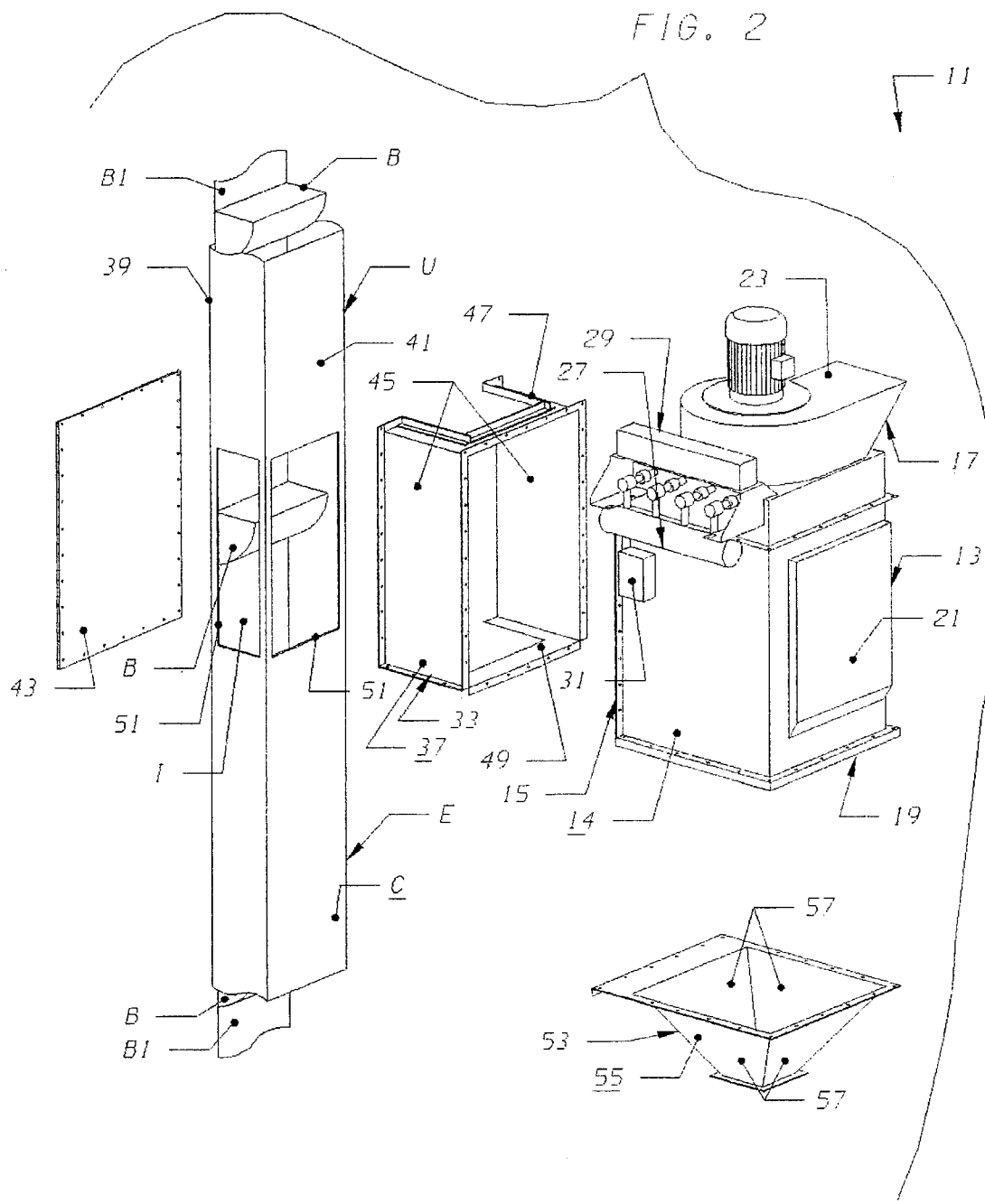
FIG. 2 is an exploded perspective view of FIG. 1.
Figure 3:
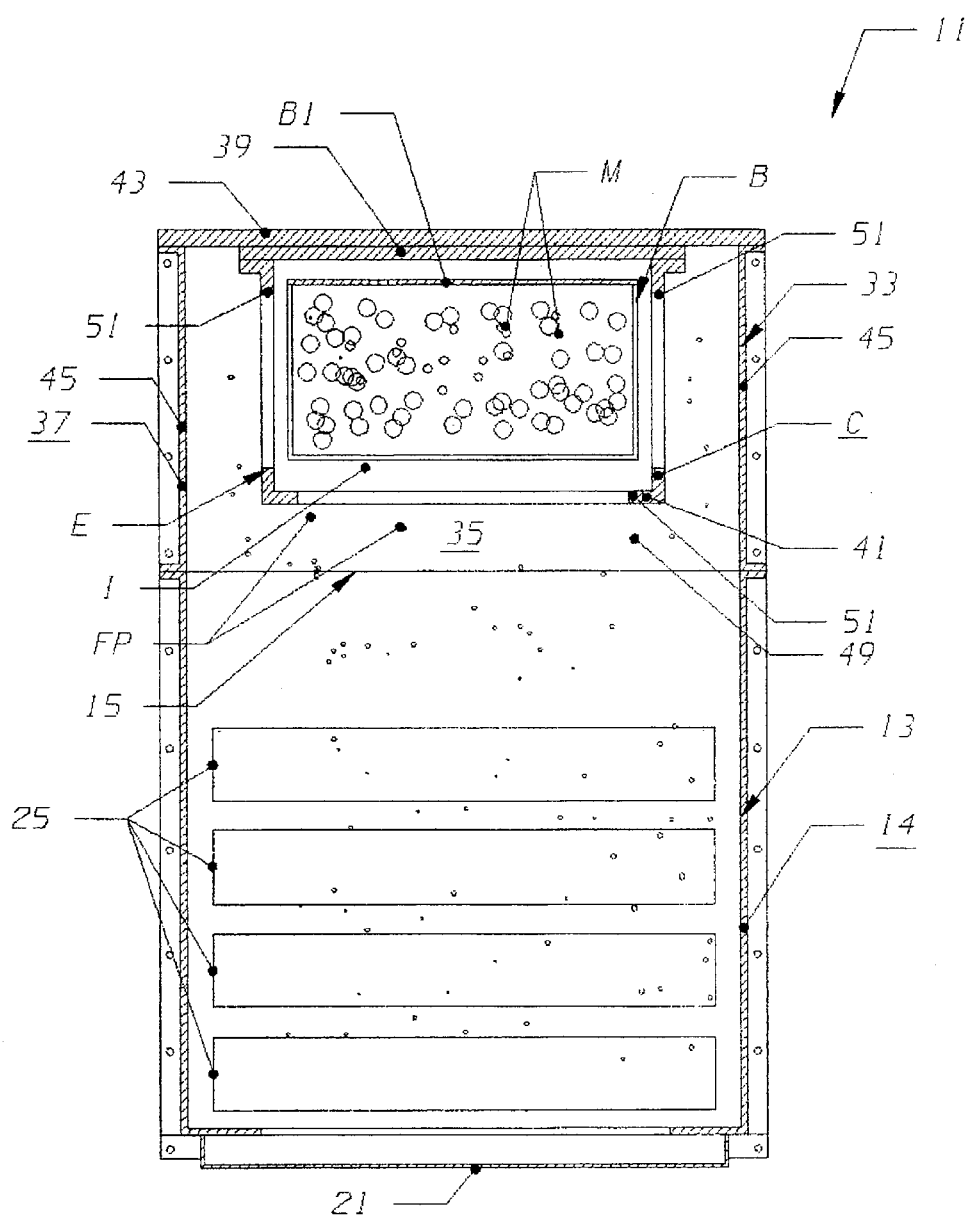
FIG. 3 is a somewhat diagrammatic sectional view substantially as taken on line 3—3 of FIG. 1 with portions omitted and moved for clarity.
Figure 4:
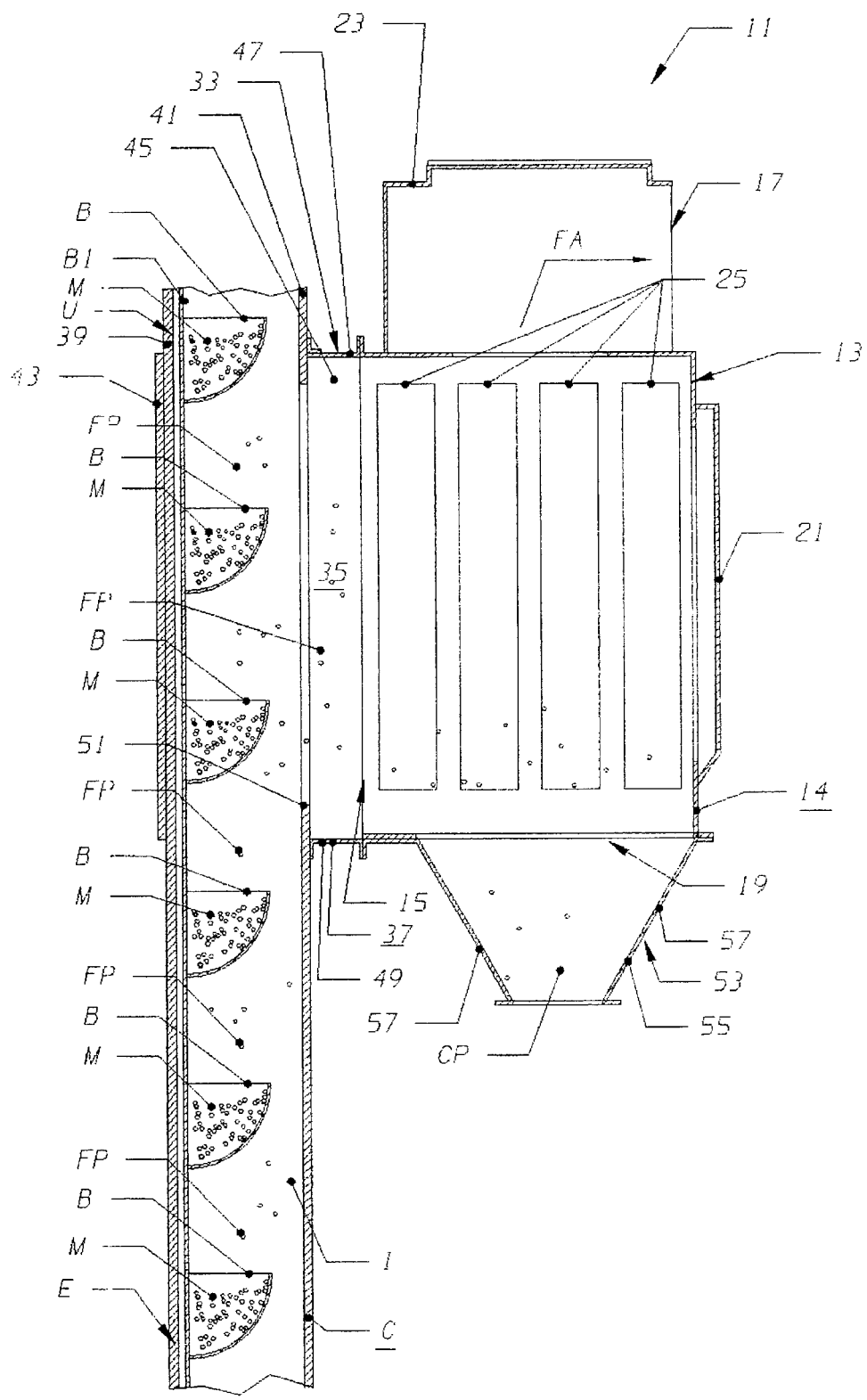
FIG. 4 is a somewhat diagrammatic sectional view substantially as taken on line 4—4 of FIG. 1 with portions omitted and moved for clarity.

A first preferred embodiment of the filter apparatus of the present invention is shown in FIGS. 1–4, and identified by the numeral 11. The filter apparatus 11 is specifically designed to filter or capture fugitive airborne particles FP (i.e., dust and the like) from the interior I of the hollow casing C of a bucket elevator E and to transfer such captured particles CP to a conveyor or the like for remote disposal or storage, etc.

The filter apparatus 11 includes filter means 13 for removing fugitive particles FP from air. The filter means 13 preferably includes a hollow housing or body 14 having an inlet 15 for receiving air, a filtered air outlet 17 for discharging filtered air as indicated by the arrow FA in FIG. 4, at, for example, a 99.9% efficiency rating, and a filtered or captured particles outlet 19 for discharging captured particles CP. The housing 14 is preferably constructed out of sheet metal panels or the like, bolted or welded together, etc., in a manner to form a box-like structure having a opened back to define or form the inlet 15, a opened bottom to define or form the captured particles outlet 19, and a front door 21 for allowing access into the interior thereof. The filter means 13 preferably includes an integrated low pressure blower unit 23 associated with the housing 14 to create negative air pressure within the interior of the housing 14 to thereby pull air from the inlet 15 through the interior of the housing 14. The blower unit 23 has an outlet that defines or forms the filtered air outlet 17. The filter means 13 preferably includes filter media 25 located within the housing 14 for removing fugitive particles FP from air received through the inlet 15. The filter media 25 preferably includes of a plurality of dacron cloth bags, singed polyester filter bags or bags with carbon impregnated fibers to dissipate static electricity, but might include other types of filter media. In addition, the filter means 13 preferably includes compressed air means 27 for selectively injecting compressed air against, into and/or through the filter media 25 to periodically clean the filter media 25. The compressed air means 27 may include an air header assembly 29 for injecting compressed air into the filter media 25 to release the captured particles CP (i.e., captured dust and the like) from the filter media 25. Timing means 31 is preferably associated with the compressed air means 27 to cause the air header assembly 29 to inject compressed air into the filter media 25 at selected timed intervals, etc., blowing or otherwise causing any captured particles CP captured by the filter medial 25 to be released from the filter media 25 and to pass through the captured particles outlet 19. The filter means 13 preferably consist of a commercially available unit such as the compressed air square "BV" Bin Vent, manufactured by Aircon Corporation, P.O. Box 8446, Memphis, Tenn. 38108, of the desired size and capability.

The filter apparatus 11 includes inlet means 33 for attaching the filter means 13 to the hollow casing C of the bucket elevator E, for forming a passageway 35 between the interior I of the hollow casing C of the bucket elevator E and the inlet 15 of the filter means 13, and for allowing air to pass from the interior I of the hollow casing C of the bucket elevator E into the inlet 15 of the filter means 13. The inlet means 33 preferably includes a hollow housing 37 constructed out of sheet metal panels or the like, bolted or welded together, etc., in a manner to form a box-like structure for enclosing or replacing a portion of the hollow casing C of the bucket elevator E, and having an opened end for being joined to the open end or inlet 15 of the housing 14 of the filter means 13, so that air within the interior I of the hollow casing C of the bucket elevator E will be drawn by the blower unit 23 into and through the interior of the box-like structure, out the opened end thereof, and by or through the filter media 25 in the interior of the hollow housing 14 of the filter means 13, whereupon filtered air will pass out the filtered air outlet 17 while fugitive particles FP of dust and the like from the air are captured by the filter media 25 as the air passes thereby or therethrough.

The specific construction and design of the inlet means 33 may vary depending on the specific design of the bucket elevator E and filter means 13, etc. For example, for bucket elevators E having casings C with a back plate 39 bolted or otherwise attached to a body construct 41 having a generally U-shaped cross-section, the housing 37 may form a open-end box construct including a back plate 43 for being bolted to the back plate 39 of the casing C, side plates 45 for being bolted or otherwise attached at one end to the back plate 43 on opposite sides of the body construct 41 with a space therebetween as clearly shown in FIG. 3 and at the other end to the housing 14 of the filter means 13 adjacent the inlet 15, and a top plate 47 and bottom plate 49 bolted or otherwise attached at one end to the back plate 43, along the sides to the side plates 45, and at the other end to the housing 14 of the filter means 13 adjacent the inlet 15, and shaped to surround the exterior of the body construct 41 so as to form a rigid and substantially air-tight connection to the casing C and to the housing 14 of the filter means 13 around the inlet 15. In such a design, openings 51 are cut or otherwise formed in the front and sides of the body construct 41 of the casing C in a location to be sealed within the housing 37 so that air will be drawn from the interior I of the casing C, out the openings 51 into the interior of the housing 37, through the passageway 35, and into the inlet 15 of the housing 14 of the filter means 13, etc., as will now be apparent to those skilled in the art. Appropriate flanges, seals and the like may be provide on the various plates, etc., to allow the housing 37 to be easily and securely assembled and attached to the casing C of the bucket elevator E and to the housing 14 of the filter means 13, as will now be apparent to those skilled in the art. Other constructions and designs of the inlet means 33 will now be apparent to those skilled in the art. For example, the housing 37 of the inlet means 33 may be designed to replace a portion of the casing C of the bucket elevator E, etc.

The filter apparatus 11 preferably includes outlet means 53 mounted to the captured particles outlet 19 of the filter means 13 for directing captured particles CP from the captured particles outlet 19 of the filter means 13. The outlet means 53 preferably includes a hollow housing 55 constructed out of sheet metal panels or the like, bolted or welded together, etc., in a manner to form a funnel or box-like structure having an opened top end for being joined to the housing 14 of the filter means 13 at the captured particles outlet 19, so that captured particles CP within the interior of the housing 14 of the filter means 13 can pass through the captured particles outlet 19, into the housing 55 of the outlet means 53, and having an opened bottom end for allowing the captured particles CP to pass thereout, and having a passageway extending between the opened top end and the opened bottom end thereof for communicating with the interior of the housing 14 of the filter means 13 and for a directing captured particles CP from the captured particles outlet 19 of the filter means 13 through the opened top end and out the opened bottom end to a remote discharge location for storage, disposal, or further processing, etc.

The specific construction and design of the outlet means 53 may vary depending on the specific design of the filter means 13, etc. For example, the housing 55 may include four side plates 57 for being bolted or otherwise attached to one another along each edge thereof and, at one end, to the to the housing 14 of the filter means 13 adjacent the captured particles outlet 19 of the housing 14 of the filter means 13, and shaped to form a rigid and substantially air-tight, funnel-like construct connected to the housing 14 of the filter means 13 around the captured particles outlet 19. Appropriate flanges, seals and the like may be provide on the various plates, etc., to allow the housing 55 to be easily and securely assembled and attached to the housing 14 of the filter means 13, as will now be apparent to those skilled in the art. Other constructions and designs of the outlet means 53 will now be apparent to those skilled in the art.

A conveyor, such as a typical pneumatic conveyor 59, etc., may be associated with the outlet means 53 for conveying captured particles CP from the outlet means 53 to a remote location. The pneumatic conveyor 59 may include feed hopper means 61 or the like joined to the opened bottom end of the housing 55 of the outlet means 53 for joining the housing 55 of the outlet means 53 to a conveyor tube 63 of the pneumatic conveyor 59, etc. Appropriate flanges, seals and the like may be provide on the various elements, etc., to allow the housing 55 to be easily and securely attached to the feed hopper means 61 of the pneumatic conveyor 59, as will now be apparent to those skilled in the art.

Figure 5:
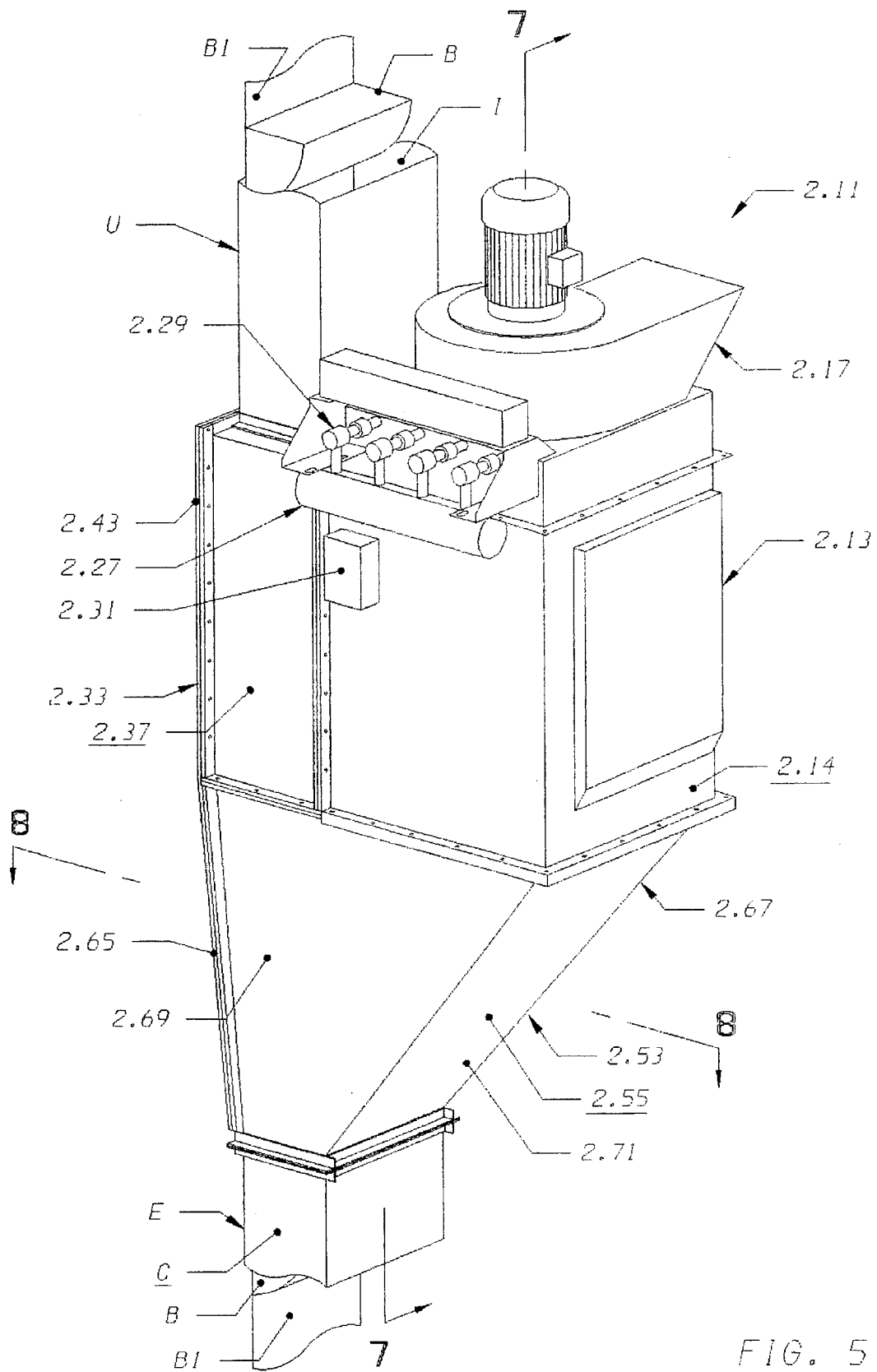
FIG. 5 is a somewhat diagrammatic perspective view of a second embodiment of the filter apparatus of the present invention, shown combined with a bucket elevator.
Figure 6:
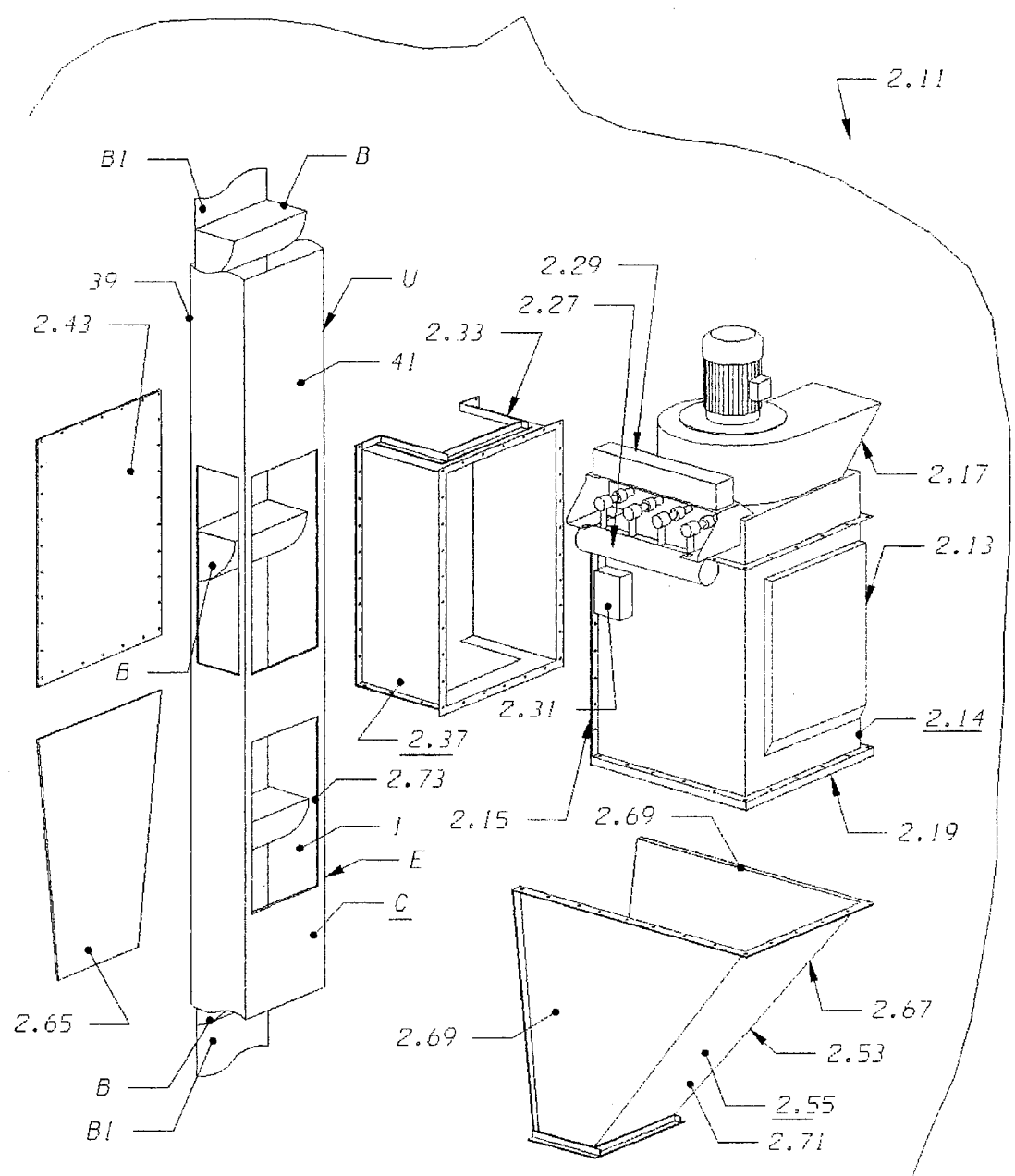
FIG. 6 is an exploded perspective view of FIG. 5.
Figure 7:
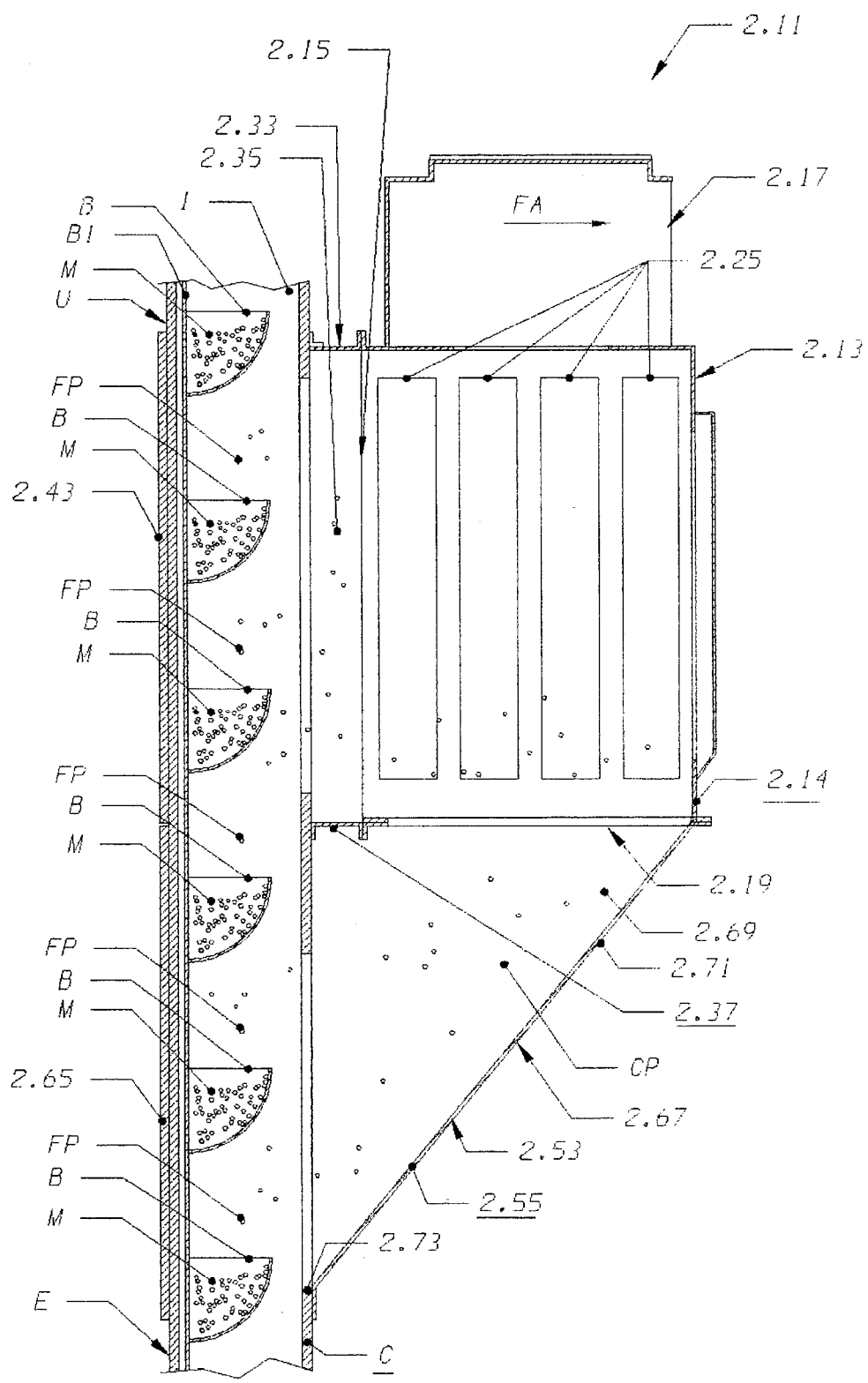
FIG. 7 is a somewhat diagrammatic sectional view substantially as taken on line 7—7 of FIG. 5 with portions omitted and moved for clarity.
Figure 8:
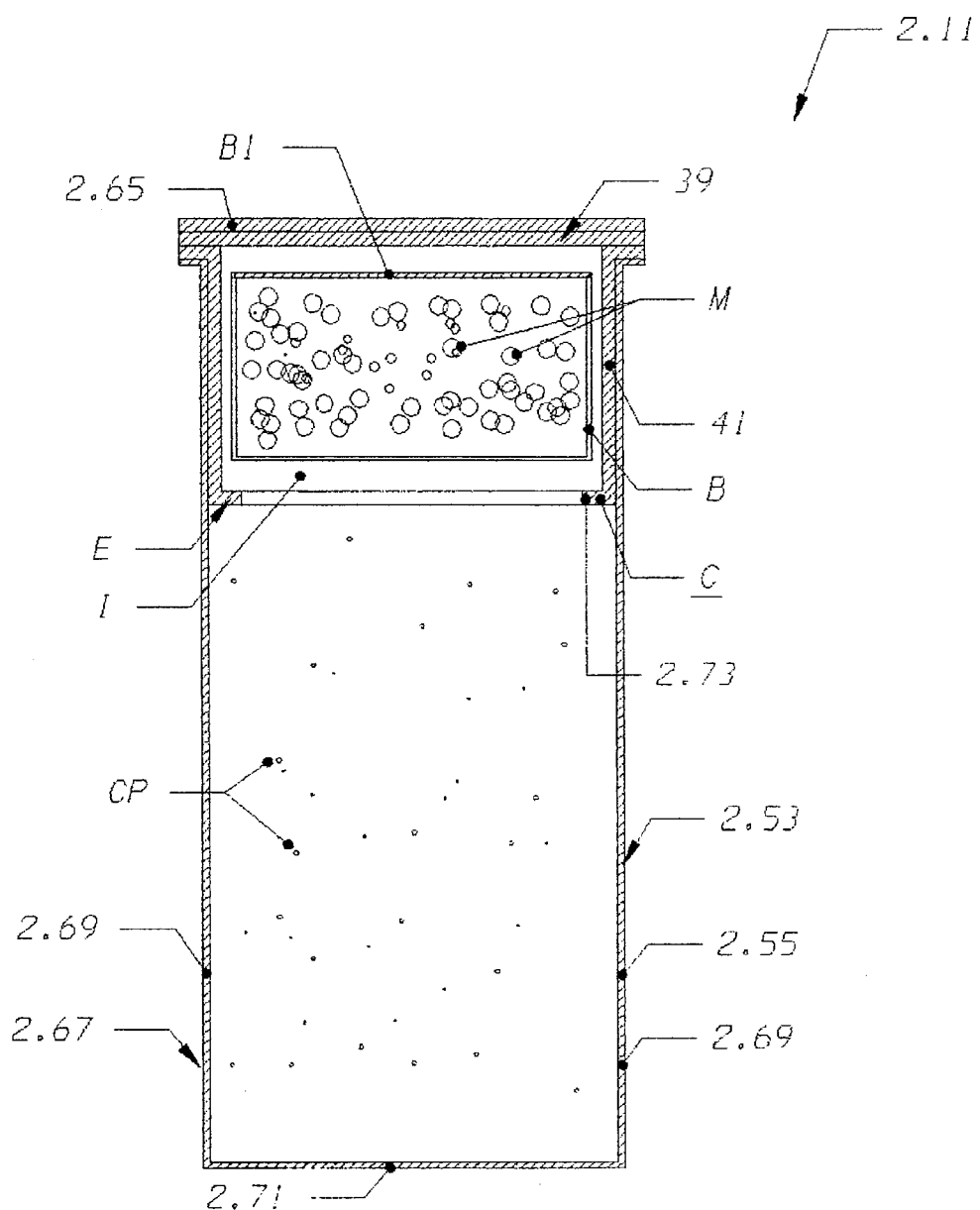
FIG. 8 is a somewhat diagrammatic sectional view substantially as taken on line 8—8 of FIG. 5 with portions omitted and moved for clarity.

A second preferred embodiment of the filter apparatus of the present invention is shown in FIGS. 5–8, and identified by the numeral 2.11. The filter apparatus 2.11 is also specifically designed to filter or capture fugitive airborne particles FP (i.e., dust and the like) from the interior I of the hollow casing C of a bucket elevator E and to transfer such captured particles CP to a conveyor or the like for remote disposal or storage, etc.

The filter apparatus 2.11 includes filter means 2.13 for removing fugitive particles FP from air. The filter means 2.13 is preferably identical to the filter means 13 of the filter apparatus 11, and preferably includes a hollow housing or body 2.14 having an inlet 2.15 for receiving air, a filtered air outlet 2.17 for discharging filtered air as indicated by the arrow FA in FIG. 7, a filtered or captured particles outlet 2.19 for discharging captured particles CP, filter media 2.25 located within the housing 2.14 for removing fugitive particles FP from air received through the inlet 2.15, compressed air means 2.27 for selectively injecting compressed air against, into and/or through the filter media 2.25 to periodically clean the filter media 2.25. The compressed air means 2.27 may include an air header assembly 2.29 for injecting compressed air into the filter media 2.25 to release the captured particles CP, and timing means 2.31 is preferably associated with the compressed air means 2.27 to cause the air header assembly 2.29 to inject compressed air into the filter media 2.25 at selected timed intervals, etc., blowing or otherwise causing any captured particles CP captured by the filter medial 2.25 to be released from the filter media 2.25 and to pass through the captured particles outlet 2.19. Reference should be made to the above disclosure of the filter means 13 for a complete and thorough understanding of the construction and function of the filter means 2.13.

The filter apparatus 2.11 includes inlet means 2.33 for attaching the filter means 2.13 to the hollow casing C of the bucket elevator E, for forming a passageway 2.35 between the interior I of the hollow casing C of the bucket elevator E and the inlet 2.15 of the filter means 2.13, and for allowing air to pass from the interior I of the hollow casing C of the bucket elevator E into the inlet 2.15 of the filter means 2.13. The inlet means 2.33 is preferably identical or substantially identical to the inlet means 33 of the filter apparatus 11 preferably includes a hollow housing 2.37 that may have a back plate 2.43 for being bolted to the back plate 39 of the casing C of the bucket elevator E (depending on the construction of the casing C, etc.), and the like. Reference should be made to the above disclosure of the inlet means 33 for a complete and thorough understanding of the construction and function of the inlet means 2.33.

The filter apparatus 2.11 preferably includes outlet means 2.53 mounted to the captured particles outlet 2.19 of the filter means 2.13 for directing captured particles CP from the captured particles outlet 2.19 of the filter means 2.13. The outlet means 2.53 preferably includes a hollow housing 2.55 constructed out of sheet metal panels or the like, bolted or welded together, etc., in a manner to form a funnel or box-like structure having an opened top end for being joined to the housing 2.14 of the filter means 2.13 at the captured particles outlet 2.19, so that captured particles CP within the interior of the housing 2.14 of the filter means 2.13 can pass through the captured particles outlet 19, into the housing 2.55 of the outlet means 2.53, and having an opened bottom end for allowing the captured particles CP to pass therethrough, and having a passageway extending between the opened top end and the opened bottom end thereof for communicating with the interior of the housing 2.14 of the filter means 2.13 and for a directing captured particles CP from the captured particles outlet 2.19 of the filter means 2.13 through the opened top end and through the opened bottom end. The important difference between the filter apparatus 11 and the filter apparatus 2.11 is that in the filter apparatus 2.11, the opened bottom end of the housing 2.55 of the outlet means 2.53 is specifically designed for communicating with the interior I of the hollow casing C of the bucket elevator E and for directing captured particles CP from the captured particles outlet 2.19 of the filter means 2.13 back into the interior I of the hollow casing C of the bucket elevator E at a point below the inlet means 2.33, to thereby recycle the captured particles CP through the bucket elevator E.

The specific construction and design of the outlet means 2.53 may vary depending on the specific design of the casing C of the bucket elevator E, and the filter means 2.13, etc. For example, for bucket elevators E having casings C with a back plate 39 bolted or otherwise attached to a body construct 41 having a generally U-shaped cross-section as hereinabove described, the housing 2.55 may include a back plate 2.65 for being bolted to the back plate 39 of the casing C (the back plate 2.65 may be constructed as an integral, one-piece unit with the back plate 2.43 of the housing 2.37 of the inlet means 2.33), and a hopper or funnel-like construct 2.67 including a pair of side walls 2.69 for being bolted or otherwise attached at one end to the back plate 2.65 on opposite sides of the body construct 41 as clearly shown in FIG. 8 and at the other end to the housing 2.14 of the filter means 2.13 adjacent the captured particles outlet 2.19 (see FIG. 7) and a front wall 2.71 bolted or otherwise attached at one end to the housing 2.14 of the filter means 2.13 adjacent the captured particles outlet 2.19, formed integral with or otherwise attached along the sides to the side plates 2.67, and bolted or otherwise attached at the other end to the casing C of the bucket elevator E so as to form a rigid and substantially air-tight passageway between the captured particles outlet 2.19 of the filter means 2.13 and the casing C of the bucket elevator E. In such a design, an opening 2.73 is cut or otherwise formed in the front of the body construct 41 of the casing C in a location to be sealed within the housing 2.55 so that captured particles CP can pass from the captured particles outlet 2.19 of the filter means 2.13, through the passageway formed by the housing 2.55 of the outlet means 2.53, and back into the interior I of the casing C of the bucket elevator E through the opening 2.73 by gravity, etc., as will now be apparent to those skilled in the art. Appropriate flanges, seals and the like may be provide on the various plates, walls, etc., to allow the housing 2.55 to be easily and securely assembled and attached to the casing C of the bucket elevator E and to the housing 2.14 of the filter means 2.13, as will now be apparent to those skilled in the art. Other constructions and designs of the outlet means 2.53 will now be apparent to those skilled in the art. For example, the housing 2.55 of the outlet means 2.53 may be designed to replace a portion of the casing C of the bucket elevator E, etc.

The operation and use of both embodiments of the filter apparatus of the present invention is similar. Operation of the bucket elevator E to move material M through the hollow casing C will cause fugitive airborne dust particles FP within the interior I of the casing C. Once properly assembled and attached to a bucket elevator E as hereinabove disclosed, either filter apparatus 11, 2.11 will create a negative air pressure which ventilates the casing C and convey fugitive dust particles FP to the associated filter means 13, 2.13, where the fugitive dust particles FP are captured on the filter media 25, 2.25. Thereafter, the timing means 31, 2.31 will periodically activate the compressed air means 27, 2.27 to inject compressed air into the filter media 25, 2.25 at selected time intervals, etc., blowing or otherwise causing any captured particles CP captured by the filter medial 25, 2.25 to be released from the filter media 25, 2.25 and to pass through the associated captured particles outlet 19, 2.19. The outlet means 53 of the filter apparatus 11 will then transfer such captured particles CP to a pneumatic conveyor 59 or the like from the outlet means 53 to a remote location, while the outlet means 2.53 of the filter apparatus 2.11 will then transfer such captured particles CP back into the product flow in the interior I of the casing C of the bucket elevator E.

Although the present invention has been described and illustrated with respect to preferred embodiments and preferred uses therefor, it is not to be so limited since modifications and changes can be made therein which are within the full intended scope of the invention.

I claim:

1. A filter apparatus for a material elevator of the type including a hollow casing having an interior, and including means mounted within the interior of the hollow casing for moving material through the interior of the hollow casing; the filter apparatus comprising:
    (a) filter means for removing fugitive airborne particles from air; the filter means having an inlet for receiving air, a filtered air outlet for discharging filtered air, and a captured particles outlet for discharging captured particles; and
    (b) inlet means for attaching the filter means to the hollow casing of the material elevator, for forming a passageway between the interior of the hollow casing of the material elevator and the inlet of the filter means, and for allowing air to pass from the interior of the hollow casing of the material elevator into the inlet of the filter means.

2. The filter apparatus of claim 1 in which is included outlet means for mounting to the captured particles outlet of the filter means and for directing captured particles from the captured particles outlet of the filter means.

3. The filter apparatus of claim 2 in which the outlet means includes a housing having a passageway for communicating with the captured particles outlet of the filter means and with the interior of the hollow casing of the material elevator and for a directing captured particles from the captured particles outlet of the filter means back into the interior of the hollow casing of the material elevator.

4. The filter apparatus of claim 2 in which the outlet means includes a housing having a passageway for communicating with the captured particles outlet of the filter means and for a directing captured particles from the captured particles outlet of the filter means to a remote discharge location.

5. The filter apparatus of claim 2 in which the filter means includes a plurality of bag filters, and compressed air means for periodically cleaning the plurality of bag filters.

6. A filter apparatus for a bucket elevator of the type including a hollow casing having an interior, and including a plurality of buckets mounted within the interior of the hollow casing for moving material through the interior of the hollow casing; the filter apparatus comprising:
    (a) filter means for removing fugitive airborne particles from air; the filter means having an inlet for receiving air, a filtered air outlet for discharging filtered air, and a captured particles outlet for discharging captured particles;
    (b) inlet means for attaching the filter means to the hollow casing of the bucket elevator, for forming a passageway between the interior of the hollow casing of the bucket elevator and the inlet of the filter means, and for allowing air to pass from the interior of the hollow casing of the bucket elevator into the inlet of the filter means; and
    (c) outlet means for mounting to the captured particles outlet of the filter means and for directing captured particles from the captured particles outlet of the filter means.

7. The filter apparatus of claim 6 in which the outlet means includes a housing having a passageway for communicating with the captured particles outlet of the filter means and with the interior of the hollow casing of the bucket elevator and for a directing captured particles from the captured particles outlet of the filter means back into the interior of the hollow casing of the bucket elevator.

8. The filter apparatus of claim 6 in which the outlet means includes a housing having passageway means for communicating with the captured particles outlet of the filter means and for a directing captured particles from the captured particles outlet of the filter means to a remote discharge location.

9. The filter apparatus of claim 8 in which is includes a conveyor associated with the outlet means for conveying captured particles from the outlet means to a remote location.

10. The filter apparatus of claim 6 in which the filter means includes a plurality of bag filters, and compressed air means for periodically cleaning the plurality of bag filters.

11. In combination:
    (a) a bucket elevator including a hollow casing having an interior, and including a plurality of buckets mounted within the interior of the hollow casing for moving material through the interior of the hollow casing; and
    (b) filter apparatus attached directly to the hollow casing of the bucket elevator, the filter apparatus comprising:
        (i) filter means for removing fugitive airborne particles from air; the filter means having an inlet for receiving air, a filtered air outlet for discharging filtered air, and a captured particles outlet for discharging captured particles;
        (ii) inlet means attaching the filter means to the hollow casing of the bucket elevator, forming a passageway between the interior of the hollow casing of the bucket elevator and the inlet of the filter means, and allowing air to pass from the interior of the hollow casing of the bucket elevator into the inlet of the filter means; and
        (iii) outlet means mounted to the captured particles outlet of the filter means and directing captured particles from the captured particles outlet of the filter means.

* * * * *